United States Patent
Harpur et al.

(10) Patent No.: US 10,187,346 B2
(45) Date of Patent: Jan. 22, 2019

(54) ANALYSIS OF SOCIAL INTERACTION SENTIMENT

(71) Applicant: International Business Machines Corporation, Armonk, NY (US)

(72) Inventors: Liam Harpur, Dublin (IE); Philip Mullins, Dublin (IE); Eric Woods, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 351 days.

(21) Appl. No.: 14/690,706

(22) Filed: Apr. 20, 2015

(65) Prior Publication Data
US 2016/0308816 A1 Oct. 20, 2016

(51) Int. Cl.
*G06Q 10/10* (2012.01)
*G06Q 50/00* (2012.01)
*H04L 12/58* (2006.01)

(52) U.S. Cl.
CPC ............. *H04L 51/32* (2013.01); *G06Q 10/10* (2013.01); *G06Q 50/01* (2013.01)

(58) Field of Classification Search
CPC ......... H04L 51/32; H04L 51/12; G06Q 10/10; G06Q 50/01
USPC ................................................. 709/205, 206
See application file for complete search history.

(56) References Cited

U.S. PATENT DOCUMENTS

| 7,822,631 B1 | 10/2010 | Vander Mey et al. |
| 8,676,887 B2 | 3/2014 | Kim et al. |
| 8,782,157 B1 | 7/2014 | Hansen |
| 2008/0104679 A1* | 5/2008 | Craig ............... H04L 67/306 726/4 |
| 2011/0191406 A1* | 8/2011 | Plunkett ............. G06F 15/16 709/203 |
| 2013/0138735 A1* | 5/2013 | Kanter ................. G06Q 50/01 709/204 |
| 2014/0040161 A1* | 2/2014 | Berlin ............... G06Q 30/0282 705/347 |
| 2014/0172989 A1* | 6/2014 | Rubinstein ............ H04L 51/12 709/206 |
| 2014/0289261 A1* | 9/2014 | Shivakumar ......... G06Q 10/101 707/748 |
| 2014/0365206 A1* | 12/2014 | Convertino ......... G06F 17/2785 704/9 |

(Continued)

OTHER PUBLICATIONS

Greg Jarboe, YouTube's New Comment System, Sep. 30, 2013, Search Engine Watch, https://searchenginewatch.com/sew/how-to/2297712/youtubes-new-comment-system-7-things-video-marketers-should-do.*

*Primary Examiner* — David R Lazaro
*Assistant Examiner* — Zi Ye
(74) *Attorney, Agent, or Firm* — Fabian VanCott; Steven L. Nichols

(57) ABSTRACT

Reducing a negative social interaction includes receiving a response to a post from a user, the response includes content to be posted on an activity stream of a social network, analyzing the content of the response to determine a negative response risk to the post, analyzing a profile of the user to determine a tendency of the user to respond negatively in responses, and executing, based on the negative response risk and the tendency, an action for the response to reduce negative responses directed towards the post.

16 Claims, 5 Drawing Sheets

(56) References Cited

U.S. PATENT DOCUMENTS

2015/0248482 A1* 9/2015 Myslinski ......... G06F 17/30867
707/706

\* cited by examiner

ANALYSIS OF SOCIAL INTERACTION SENTIMENT

BACKGROUND

The present invention relates to reducing a negative social interaction, and more specifically, to reducing a negative social interaction on a social network.

A social network is a network based application to enable a user to create a user account. Once the user account is created, the user establishes connections with other users, such as friends, family, and colleagues in an online environment. Further, once the user is connected with other users, the user may share information, in the form of messages, with each of the other users on the social network system by uploading pictures, updating personal information, updating status information, commenting on other user's information, among other activities.

BRIEF SUMMARY

A method for reducing a negative social interaction includes receiving a response to a post from a user, the response includes content to be posted on an activity stream of a social network, analyzing the content of the response to determine a negative response risk to the post, analyzing a profile of the user to determine a tendency of the user to respond negatively in responses, and executing, based on the negative response risk and the tendency, an action for the response to reduce negative responses directed towards the post.

A system for reducing a negative social interaction includes a presenting engine to present a user interface (UI) to an author of a post to determine author preferences for the post, a receiving engine to receive a response to the post from a user, the response includes content to be posted on an activity stream of a social network, a response analyzing engine to analyze the content of the response to determine a negative response risk to the post, a profile analyzing engine to analyze a profile of the user to determine a tendency of the user to respond negatively in responses, a sending engine to send at least a portion of the content of the response to a subject matter expert, and an executing engine to execute, based on the negative response risk and the tendency, an action for the response to reduce negative responses directed towards the post.

A machine-readable storage medium encoded with instructions for reducing a negative social interaction, the instructions executable by a processor of a system to cause the system to analyze content of a response to determine a negative response risk to a post analyze a profile of a user to determine a tendency of the user to respond negatively in responses, and execute, based on the negative response risk and the tendency, an action for the response to reduce negative responses directed towards the post.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
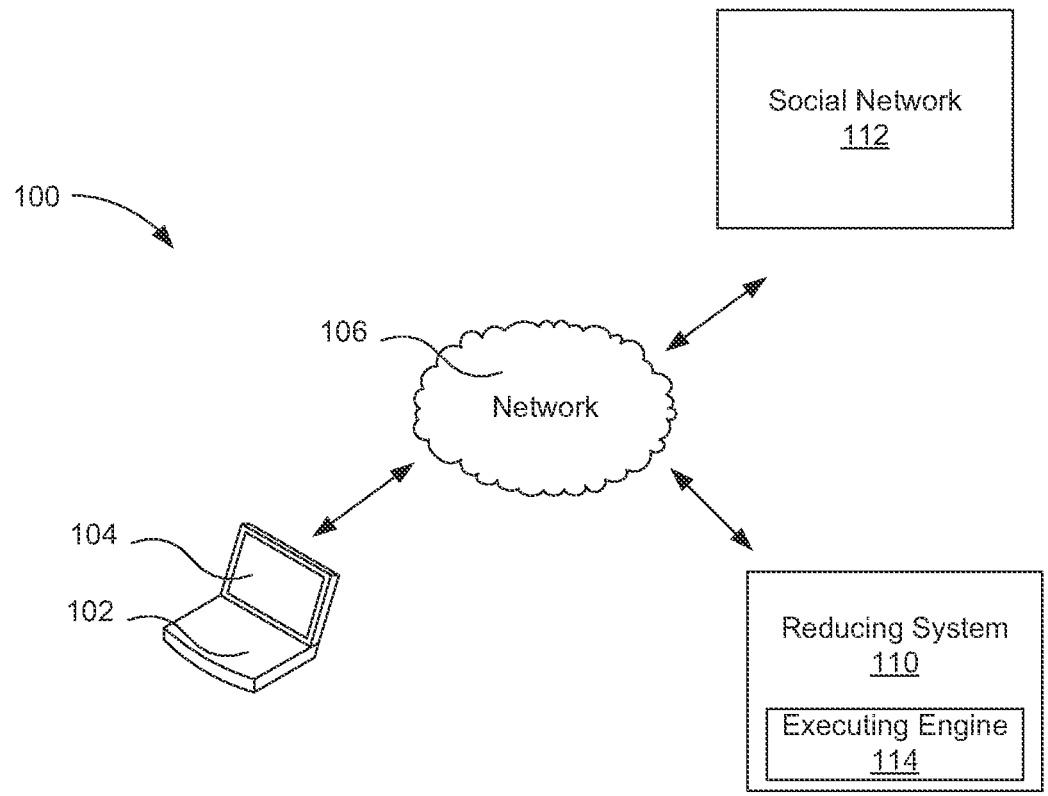
FIG. 1 is a diagram of an example of a system for reducing a negative social interaction, according to one example of principles described herein.

The present specification describes a method and system for reducing a negative social interaction, such that positive social interactions are promoted on a social network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, a social network is a network based application to enable a user to create a user account and share information with other users. Often, the information shared between the users is presented in an activity stream as posts and responses. The activity stream displays the posts and the responses in a chronological order. The most recent posts and responses are displayed at the top of the activity stream. Further, the further down a user scrolls on the activity stream, the older the as posts and responses.

While the activity stream displays the posts and the responses, the activity stream may include negative responses for the posts. Often, a moderator is assigned to manually monitor the responses to reduce negative responses directed towards the posts. If the moderator manually identifies a negative response, the moderator manually deletes the negative response. This can be a burdensome task for the moderator with hundreds of responses being posted to an activity steam of a social network each hour. Further, manually monitoring the responses to reduce the negative responses directed towards the posts can be error prone. As a result, the moderator may not delete all negative responses.

The principles described herein include a method and a system for reducing a negative social interaction. Such a method and system includes receiving a response to a post from a user, the response includes content to be posted on an activity stream of a social network, analyzing the content of the response to determine a negative response risk to the post, analyzing, a profile of the user to determine a tendency of the user to respond negatively in responses, and executing, based on the negative response risk and the tendency, an action for the response to reduce negative responses directed towards the post. Such a method allows the response to be approved, rejected, or moderated. As a result, positive social interactions are promoted on the social network.

In the present specification and in the appended claims, the term "post" means information posted by an author on a social network. The author may be a user of the social network and is the original creator of the post. The post may be posted to an activity stream, a wall, other locations on the social network, or combinations thereof. The information may include text, audio, video, images, or combinations thereof.

In the present specification and in the appended claims, the term "negative response risk" means a determination as to the probability a response of a user contains negative sentiments directed towards a post. Depending on the negative response risk, the response of the user may be approved, rejected, or moderated.

In the present specification and in the appended claims, the term "response" means a reply by a user to a post. The response may be positive or negative. The response may be in the form of text, audio, video, images, or combinations thereof.

In the present specification and in the appended claims, the term "profile" means information associated with a user on a social network. The profile may include information to allow a reducing system to determine a tendency of the user to respond negatively to a post.

In the present specification and in the appended claims, the term "tendency" means a characterization of a user to respond negatively or positively to a post. The tendency may be based on historical posts of the user.

In the present specification and in the appended claims, the term "action" means an act executed to reduce a negative social interaction on a social network. The action may include approving the response, rejecting the response, or moderating the response.

In the present specification and in the appended claims, the term "author" means a user of a social network that is an original creator of a post. The author may be a single user or a group of users.

In the present specification and in the appended claims, the term "negative response" means a response that includes negative sentiments directed towards a post. The negative response may be in the form of text, audio, video, images, or combinations thereof.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram of an example of a system for reducing a negative social interaction, according to one example of principles described herein. As will be described below, a reducing system is in communication with a network to receive a response to a post from a user, the response includes content to be posted on an activity stream of a social network. The reducing system analyzes the content of the response to determine a negative response risk to the post. Further, the reducing system analyzes a profile of the user to determine a tendency of the user to respond negatively in responses. The reducing system executes, based on the negative response risk and the tendency, an action for the response to reduce negative responses directed towards the post.

As illustrated in FIG. 1, the system (100) includes social network (112). The social network (112) is a network based application to enable a user to create a user account. Once the user account is created, the user establishes connections with other users, such as friends, family, and colleagues in an online environment. Further, once the user is connected with other users, the user may share information, in the form of posts and responses, with each of the other users on the social network (112) by uploading pictures, updating personal information, updating status information, commenting on other user's information, among other activities.

As illustrated in FIG. 1, the system (100) includes a user device (102). The user device (102) allows users of the social network (112) to access the social network (112), create user accounts, establish connections with other users, and share information. As will be described below, the display (104) of the user device (102) is used to display an activity stream of the social network (112).

The system (100) further includes a reducing system (110). The reducing system (110) is in communication with the user device (102) and the social network (112) over a network.

The reducing system (110) receives a response to a post from a user, the response includes content to be posted on an activity stream of the social network (112). As will be described below, based on the content of the response and an analysis of the user's profile, the response may be approved, rejected, or moderated.

Further, the reducing system (110) analyzes the content of the response to determine a negative response risk to the post. The negative response risk may be a determination as to the likelihood the response of the user contains negative sentiments directed towards the post.

The reducing system (110) further analyzes a profile of the user to determine a tendency of the user to respond negatively in responses. The tendency may be a characterization of the user to respond negatively or positively to a post. The tendency may be based on historical posts of the user.

Further, the reducing system (110) executes, based on the negative response risk and the tendency, an action for the response to reduce negative responses directed towards the post. The reducing system (110) may utilize an executing engine (114) to execute the action. The action may include approving, rejecting, or moderating the response. Such a system allows the response to be approved, rejected, or moderated. As a result, positive social interactions are promoted on the social network. More information about the reducing system (110) will be described later on in this specification.

While this example has been described with reference to the reducing system being located over the network, the reducing system may be located in any appropriate location according to the principles described herein. For example, the reducing system may be located in a user device, a server, a datacenter, other locations, or combinations thereof.

Figure 2:
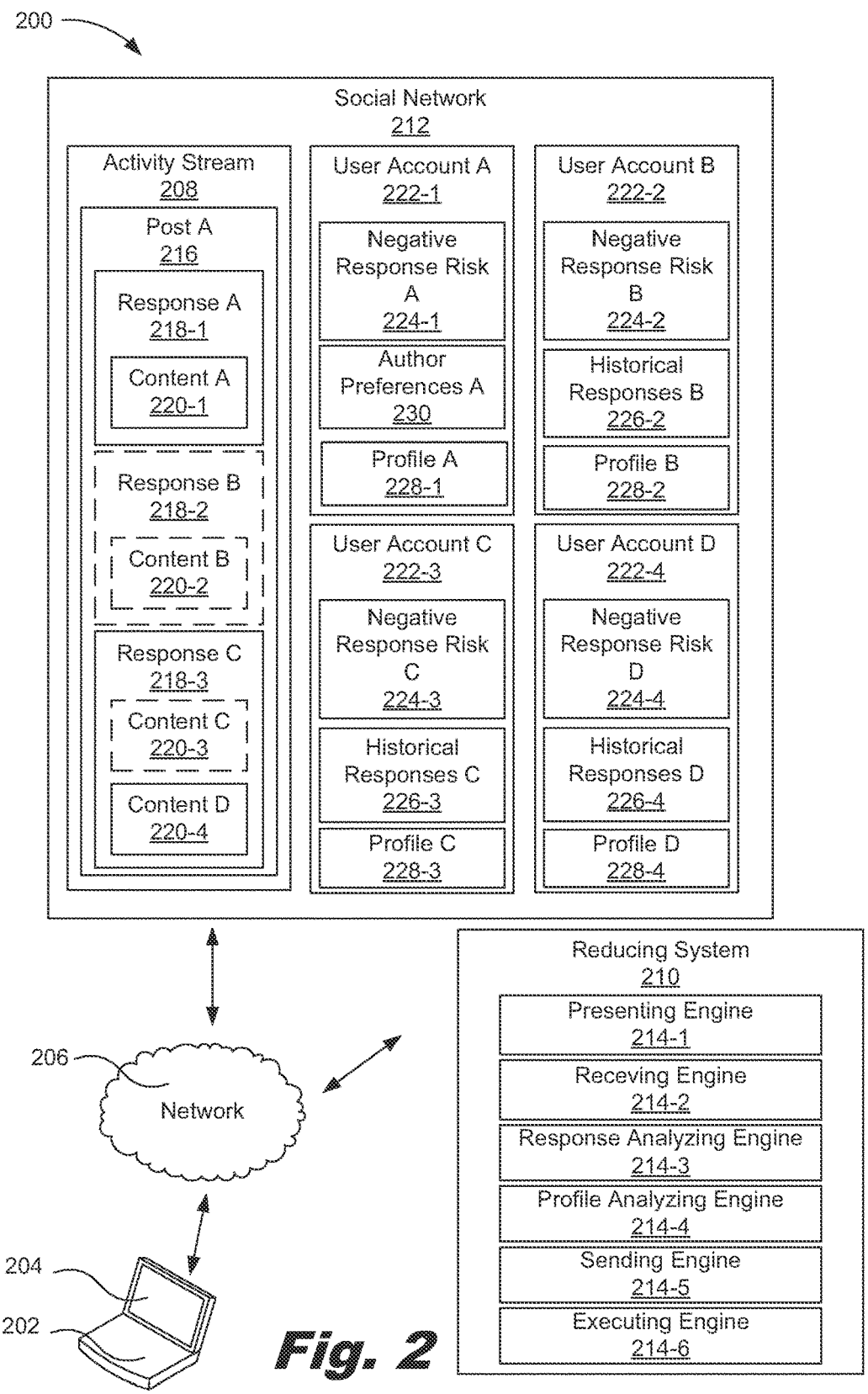
FIG. 2 is a diagram of an example of a system for reducing a negative social interaction, according to one example of principles described herein.

FIG. 2 is a diagram of an example of a system for reducing a negative social interaction, according to one example of principles described herein. As will be described below, a reducing system is in communication with a network to receive a response to a post from a user, the response includes content to be posted on an activity stream of a social network. The reducing system analyzes the content of the response to determine a negative response risk to the post. Further, the reducing system analyzes a profile of the user to determine a tendency of the user to respond negatively in responses. The reducing system executed, based on the negative response risk and the tendency, an action for the response to reduce negative responses directed towards the post.

As illustrated in FIG. 2, the system (200) includes social network (212). The social network (212) may be a traditional social network, a blog, a forum, wikis, used by the public, used by a specific company, or another type of social network.

The social network (212) may include a number of user accounts (222). The user accounts (222) may include user account A (222-1), user account B (222-2), user account C (222-3), and user account D (222-4). Further, each of the user accounts (222) may be associated with a user or a group of users. As will be described below, a user associated with user account A (222-1) uploads post A (216) to the social network (212). As a result, the user of user account A (222-1) is an author of post A (216). Further, users associated with user account B (222-2), user account C (222-3), user account D (222-4) upload responses (218) to the social network (212) to respond to post A (216).

As illustrated, each of the user accounts (222) includes a negative response risk (224). For example, user account A (222-1) includes negative response risk A (224-1). User account B (222-2) includes negative response risk B (224-2). User account C (222-3) includes negative response risk C (224-3). User account D (222-4) includes negative response risk D (224-4). As will be described below, the negative response risks (224) may be a determination as to the probability the responses (218) of the users contains negative sentiments directed towards post A (216). More information about the negative response risks (224) will be described below.

Further, since the user of user account A (222-1) uploaded post A (216) to the social network (212), user account A (222-1) includes author preferences A (230) for post A (216). As will be described below, a user interface (UI) is presented to the user of user account A (216) to allow the user to specify author preferences A (230) for post A (216).

Further, user account B (222-2) may include historical responses B (226-2). User account C (222-3) may include historical responses C (226-3). User account D (222-4) may include historical responses D (226-4). The historical responses (226) may be an analysis of a tendency for each of the users of user account B (222-2), user account C (222-3), and user account D (222-4) to respond to a post.

Further, each of the user accounts (222) may include a profile (228). For example, user account A (222-1) may include profile A (228-1). User account B (222-2) may include profile B (228-2). User account C (222-3) may include profile C (228-3). User account D (222-4) may include profile D (228-4). The profiles (228) include credentials of the user. The credentials of the user may include hobbies, interests, hometown, skills, a job history, or other credentials of the user.

Further, the profiles (228) include registered trusted entities. The registered trusted entities may include users of the social network (212) that are likely to respond positively to a post of an author. The registered trusted entities may be specified by an author as author preferences. The registered trusted entities may be inferred by a reducing system (210). In some example, the registered trusted entities are able to view a post by an author before unfamiliar entities view the post. For example, if a user of user account A (222-1) is an author of post A (216) and the user associated with user account B (222-2) is a registered trusted entity, the user associated with user account B (222-2) may view part or all of post A (222-2) before the users associated with user account C (222-3) and user account D (222-4) view part or all of post A (222-2).

The profiles (228) include subject matter expertise. The subject matter expertise may include specific skill the users have mastered. The profiles (228) may include at least one subject matter expertise for each of the users.

Further, the profiles (228) include a social circle analysis. The social circle analysis may indicate which users of the user accounts (222) are socially connected. For example, a social circle analysis for the user associated with user account D (222-4) may indicate the user associated with user account D (222-4) is socially connected with the users of user account A (222-1) and user account B (222-2).

The profiles (228) include a relationship with the author of a post. Since, the user associated with user account A (222-1) is the author of post A (216), the profiles (228) may indicate that the users associated with user account D (222-4) and user account B (222-2) are socially connected with the author. Further, the user associated with user account C (224-3) is not socially connected with the author.

As illustrated, the social network (212) includes an activity stream (208). The activity stream (208) may be displayed on a user device (202). The activity stream (208) displays posts and responses by users. For example, each of the user accounts (222) may allow users of the social network (212) to create a post and respond to the post.

As illustrated, the activity stream (208) includes post A (216). Post A (216) may be a post by the user associated with user account A (222-1). As a result, this user is the author of post A (216). Further, the activity stream (208) may include a number of responses (218). The responses (218) may be generated by the users associated with the user accounts (222-2, 222-3, and 222-4). For example, response A (218-1) may be generated by a user associated with the user account D (222-4). Response B (218-2) may be generated by a user associated with the user account B (222-2). Response C (218-3) may be generated by a user associated with the user account C (222-3).

Further, each of the response (218) includes content (220). For example, response A (218-1) includes content A (220-1). Response B (218-2) includes content B (220-2). Response C (218-3) includes content C (220-3) and content D (220-4). The content (220) may include information such as text, audio, video, images, or combinations thereof.

As illustrated in FIG. 2, the system (200) includes the user device (202). The user device (202) allows users of the social network (212) to access the social network (212), create user accounts, establish connections with other users, and share information. The display (204) of the user device (202) is used to display a UI for an author. Further the display (204) of the user device (202) is used to display the activity stream (208).

The system (200) further includes a reducing system (210). In one example, the reducing system (210) includes a processor and computer program code. The computer program code is communicatively coupled to the processor. The computer program code includes a number of engines (214). The engines (214) refer to program instructions for performing a designated function. The computer program code causes the processor to execute the designated function of the engines (214). In other examples, the engines (214) refer to a combination of hardware and program instructions to perform a designated function. Each of the engines (214) may include a processor and memory. The program instructions are stored in the memory and cause the processor to execute the designated function of the engine. As illustrated, the reducing system (210) includes a presenting engine (214-1), a receiving engine (214-2), a response analyzing engine (214-3), a profile analyzing engine (214-4), a sending engine (214-5), and an executing engine (214-6).

The presenting engine (214-1) presents a UI to an author of a post to determine author preferences for the post. In some examples, the presenting engine (214-1) presents a UI to an author on a post by post basis. For example, once an author submits a post, the UI is displayed to the author. The author may set author preferences for the post. If the author submits a subsequent post, the UI is again displayed to the author. The author may set author preferences for the subsequent post.

The author may specify that trusted register entities of the author are allowed to view the post before unfamiliar entities views the post. As a result, when the reducing system (210) executes an action, this may be one of the actions executed.

The author can set author preferences to specify content to be managed by the reducing system (210) and take into account a current role of the prospective responder. For example, if user B use to be a software engineer but is now a project manager the reducing system (210) may take that information into account.

The author preferences may include having the author manually activate the reducing system (210). Further, the author preferences may include activating the reducing system (210) based on a policy set by the author, an organization, a community, or the social network (212). Further, the author preferences may inform the author as to the functionality of the reducing system (210). For example, the reducing system may display to the author via the display (204), you have the option of allowing progressive levels of sheltered interactions. In an example, the author continues as normal posting to the social network (212) and collaborative environments aware that the reducing system (210) is protecting them from excessive negative interactions.

Further, the author preferences may allow the author to registers users, groups or communities who they believe to be are likely to respond positively in their responses as registered trusted entities. Further, a monitoring engine monitors those responses and alerts the author if these registered trusted entities are no longer responding positively in their responses. Further, in the act of ascertaining the most apt individual or group to proactively include, the reducing system (210) may be designed such that in the event of the reducing system (210) not finding a suitable involved party, that the author is alerted.

The receiving engine (214-2) receives a response to the post from a user, the response includes content to be posted on an activity stream of a social network. The response may be positive or negative. The response may be a comment or a reply to post A (216) as described above.

The response analyzing engine (214-3) analyzes the content of the response to determine a negative response risk to the post. The negative response risk may be a determination as to the probability the response of the user contains negative sentiments directed towards the post. The responses (218) may be analyzed for facts and sentiments. The determination may be made using natural language processing (NLP). NLP may be used to derive meaning from the content (220) of the responses (218). Once, the meaning is derived from the content responses (218), negative response risks (224-2) are determined for each user account (222) that posted a response as described above. In some example, the negative response risk may be symbolic such as high, medium, and low. A low negative response risk indicates the response doesn't contain negative sentiments. A high negative response risk indicates the response contains negative sentiments. Further, the negative response risk may be a range such as 0 to 10. A 0 negative response risk indicates the response doesn't contain negative sentiments. A 10 negative response risk indicates the response contains negative sentiments.

The profile analyzing engine (214-4) analyzes a profile of the user to determine a tendency of the user to respond negatively in responses. In an example, the tendency is determined by historical responses of the user. The historical responses may statically define how a user generally responds to all posts. The historical responses may statically define how a user responds to specific posts. The historical responses may be constantly updated such that the reducing system (210) may understand the relationships of users and between the users and an author. This is to prevent fair-weather syndrome where a devious users games the reducing system (210) such that they are more likely to be able to contribute to a post. Once this is achieved, the reducing system (210) understands that there is a credible trustworthiness achieved between an author and the users such that the reducing system (210) will facilitate social interactions.

The sending engine (214-5) sending at least a portion of the content of the response to a subject matter expert. In some example, the subject matter expert may manually approve, reject, or moderate the response.

The executing engine (214-6) executes, based on the negative response risk and the tendency, an action for the response to reduce negative responses directed towards the post. The action may include approving the response, rejecting the response, or moderating the response. In some examples, the executing engine (214-6) detect that all or part of a response should be intercepted by a third party, such as a subject matter expert, for approval based on the poster's historical post ratings, analysis of the post contents, or other configuration.

An overall example of FIG. 2 will now be described. The presenting engine (214-1) presents a UI to an author of the post to determine author preferences for post A (216). The author may specify author preferences as describe above. The receiving engine (214-2) receives response A (218-1), response B (218-2), and response C (218-3) to post A (216) from users associated with user account D (222-4), user account B (222-2), and user account C (222-3). The response analyzing engine (214-3) analyzes the content (220) of the responses to determine a negative response risk to post A (216). Negative response risk D (224-4) indicates response A (218-1) does not include negative sentiments towards post A (216). Negative response risk B (224-2) indicates response B (218-2) does include negative sentiments towards post A (216). Further, negative response risk C (224-4) indicates response C (218-3) includes some negative sentiments towards post A (216).

The profile analyzing engine (214-4) analyzes the profiles (228) of the users to determine a tendency of the user to respond negatively in responses. Profile A (228-1) indicates the user associated with user account D (224-4) is a registered trusted entity. As a result, the tendency of the user associated with user account D (224-4) is to respond positively. Profile B (228-2) indicates the user associated with user account B (224-2) is an unfamiliar entity. As a result, the tendency of the user associated with user account B (224-2) is unknown and may respond negatively. Profile C (228-3) indicates the user associated with user account C (224-3) has a tendency to sometimes respond negatively.

The sending engine (214-5) sends at least a portion of the content (220) of the response to a subject matter expert. The subject matter expert may be the user associated with user account D (222-4). The executing engine (214-6) executes, based on the negative response risk and the tendency, an action for the response to reduce negative responses directed towards the post. In an example, response A (218-1) is approved, response B (218-2) is rejected by deleting response B (218-2) as indicated by the dashed lines, and response C (218-3) is moderated by deleting content C (220-3) as indicated by the dashed lines. In some examples, the responses (218) are not displayed on the activity stream (208) until the executing engine (214-6) executes an action.

Figure 3:
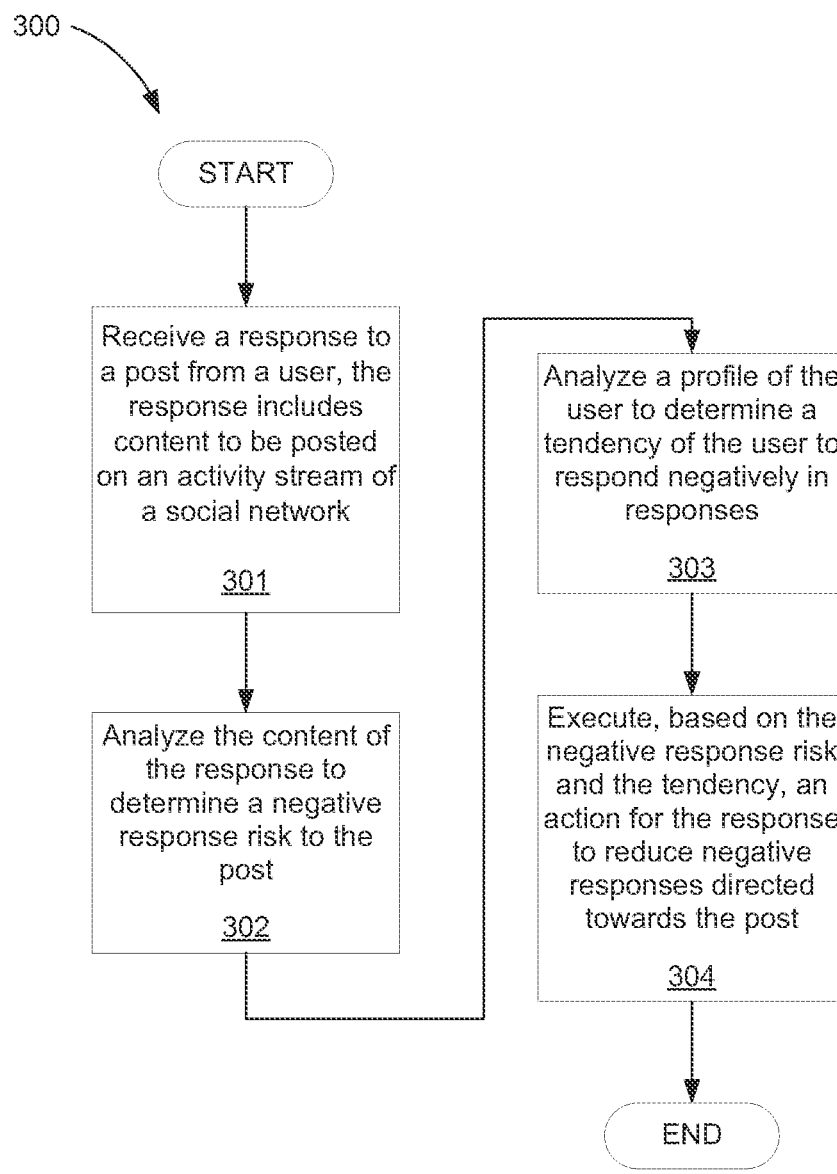
FIG. 3 is a flowchart of an example of a method for reducing a negative social interaction, according to one example of principles described herein.

FIG. 3 is a flowchart of an example of a method for reducing a negative social interaction, according to one example of principles described herein. In one example, the method (300) may be executed by the system (100) of FIG.

1. In other examples, the method (300) may be executed by other systems such as system 200, system 500, or system 600. In this example, the method (300) includes receiving (301) a response to a post from a user, the response includes content to be posted on an activity stream of a social network, analyzing (302) the content of the response to determine a negative response risk to the post, analyzing (303), a profile of the user to determine a tendency of the user to respond negatively in responses, and permitting (304) based on the negative response risk and the tendency, an action for the response to reduce negative responses directed towards the post.

As mentioned above, the method (300) includes receiving (301) a response to a post from a user, the response includes content to be posted on an activity stream of a social network. The response may be from a user and/or a group of users on the same social network as the post. The response may be from a user and/or a group of users on a different social network than the post. The interception of the content can be a partial or full. For example, the method (300) may display part of the response to specified users and other parts of the content to other users.

As mentioned above, the method (300) includes analyzing (302) the content of the response to determine a negative response risk to the post. The method (300) may analyze specific parts of the content or all of the content. The negative response risk may be determined as described above.

As mentioned above, the method (300) includes analyzing (303), a profile of the user to determine a tendency of the user to respond negatively in responses. The method (300) may analyze the profile of the user on the same social network the response is to be posted to. The method (300) may analyze the profile of the user on a different social network the response is to be posted to.

In some examples, the tendency may be symbolic such as high, medium, and low. A low tendency indicates the responses of the user don't normally contain negative sentiments. A high tendency indicates the responses of the user normally contain negative sentiments. Further, the tendency may be a range such as 0 to 10. A 0 tendency indicates the responses of the user don't normally contain negative sentiments. A 10 tendency indicates the responses of the user normally contain negative sentiments.

As mentioned above, the method (300) includes executing (304), based on the negative response risk and the tendency, an action for the response to reduce negative responses directed towards the post. The action may include approving the response. This action allows all the contents of the response to be posted to an activity stream of a social network. The action may include rejecting the response. This action does not allow any of the contents of the response to be posted to an activity stream of a social network. The action may include moderating the response. This action allows specific parts of the contents of the response to be posted to an activity stream of a social network. The action may include allowing registered trusted entities of the author to view the post before unfamiliar entities views the post.

Figure 4:
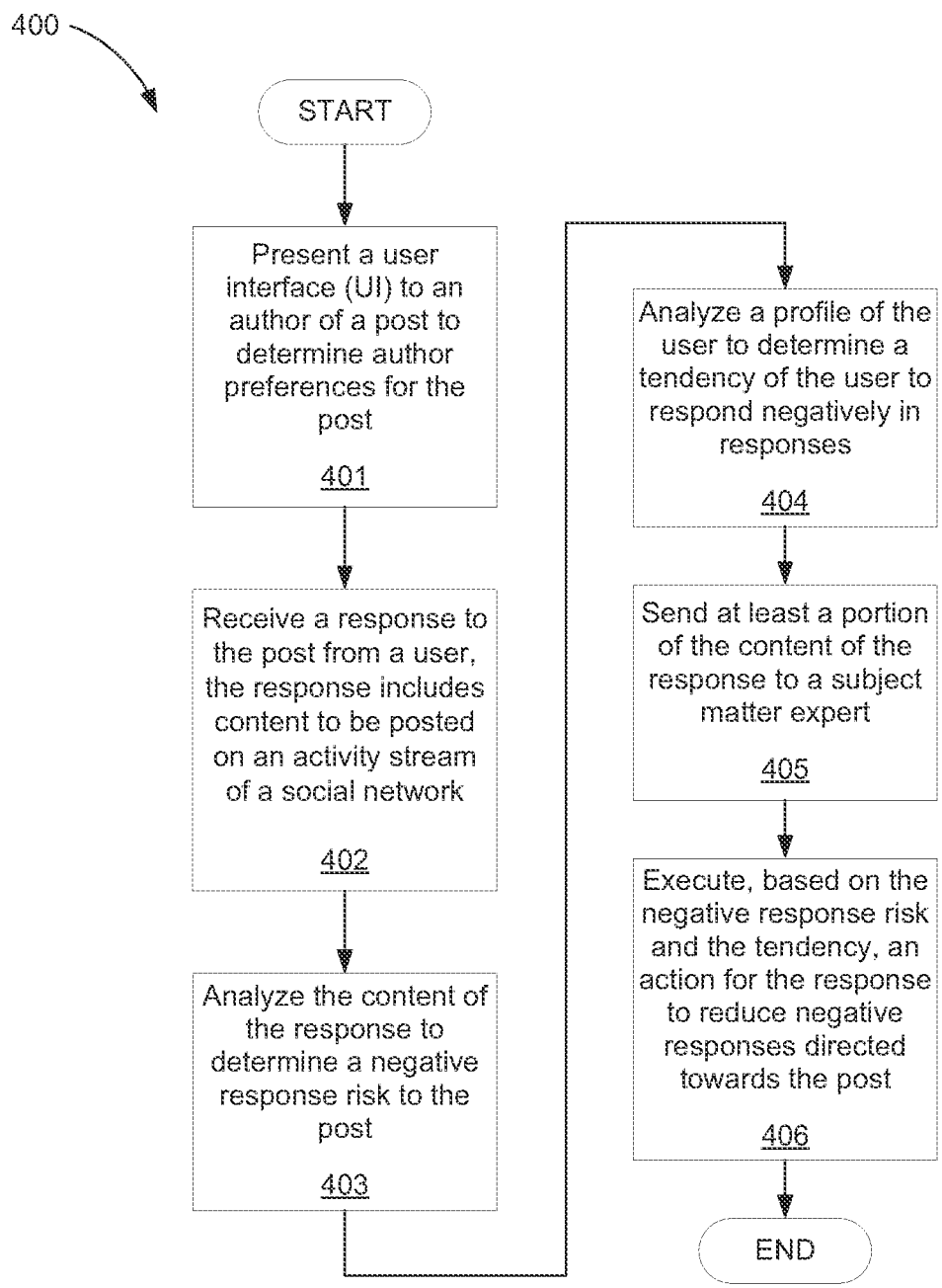
FIG. 4 is a flowchart of an example of a method for reducing a negative social interaction, according to one example of principles described herein.

FIG. 4 is a flowchart of an example of a method for reducing a negative social interaction, according to one example of principles described herein. In one example, the method (400) may be executed by the system (100) of FIG. 1. In other examples, the method (400) may be executed by other systems such as system 200 or system 500. In this example, the method (400) includes presenting (401) a UI to an author of a post to determine author preferences for the post, receiving (402) a response to the post from a user, the response includes content to be posted on an activity stream of a social network, analyzing (403) the content of the response to determine a negative response risk to the post, analyzing (404) a profile of the user to determine a tendency of the user to respond negatively in responses, sending (405) at least a portion of the content of the response to a subject matter expert, and executing (406), based on the negative response risk and the tendency, an action for the response to reduce negative responses directed towards the post.

As mentioned above, the method (400) includes presenting (401) a UI to an author of a post to determine author preferences for the post. The UI may be presented to the author when the author accesses a social network. The UI may be presented to the author when the post is created. Further, the UI allows the author to specify which users can view the post first and an action to execute for responses to the post. As a result, the author preferences for the post may reduce negative responses directed towards the post.

As mentioned above, the method (400) includes sending (405) at least a portion of the content of the response to a subject matter expert. The method (400) may identify the subject matter expert via a profile of the users of the social network. Once the subject matter expert is identified, at least a portion of the content of the response is sent to the subject matter expert for validation. The validation may include having the subject matter expert check facts of the content of the response and determine if the content of the response is true or untrue. If the content of the response is true, the subject matter expert may alert the method (400) that the content of the response is true and is to be approved. If the content of the response is untrue, the subject matter expert may alert the method (400) that the content of the response is untrue and is to be rejected.

Figure 5:
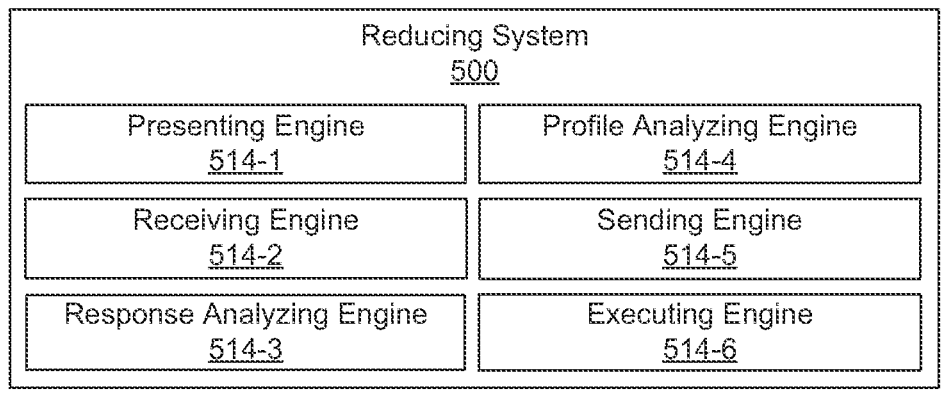
FIG. 5 is a diagram of an example of a reducing system, according to the principles described herein.

FIG. 5 is a diagram of a reducing system, according to one example of principles described herein. The reducing system (500) includes a presenting engine (514-1), a receiving engine (514-2), a response analyzing engine (514-3), a profile analyzing engine (514-4), a sending engine (514-5), and an executing engine (514-6). The engines (514) refer to a combination of hardware and program instructions to perform a designated function. Alternatively, the engines (514) may be implemented in the form of electronic circuitry (e.g., hardware). Each of the engines (514) may include a processor and memory. Alternatively, one processor may execute the designated function of each of the engines (514). The program instructions are stored in the memory and cause the processor to execute the designated function of the engine.

The presenting engine (514-1) presents a UI to an author of a post to determine author preferences for the post. The presenting engine (514-1) presents one UI to the author. The presenting engine (514-1) presents several UIs to the author.

The receiving engine (514-2) receives a response to a post from a user, the response includes content to be posted on an activity stream of a social network. The receiving engine (514-2) receives one response to one post from one user. The receiving engine (514-2) receives several responses to a post from one user. The receiving engine (514-2) receives several responses to several posts from one user. The receiving engine (514-2) receives several responses to several posts from several users.

The response analyzing engine (514-3) analyzes the content of the response to determine a negative response risk to the post. The response analyzing engine (514-3) analyzes one portion of the content of the response to determine a negative response risk to the post. The response analyzing engine (514-3) analyzes several portions of the content of the response to determine several negative response risks to the post.

The profile analyzing engine (514-4) analyzes a profile of the user to determine a tendency of the user to respond negatively in responses. The profile analyzing engine (514-4) analyzes one profile of the user to determine a tendency of the user to respond negatively in responses. The profile analyzing engine (514-4) analyzes several profiles of the user to determine several tendencies of the user to respond negatively in responses.

The sending engine (514-5) sends at least a portion of the content of the response to a subject matter expert. The sending engine (514-5) sends at least a portion of the content of the response to several subject matter experts.

The executing engine (514-6) executes, based on the negative response risk and the tendency, an action for the response to reduce negative responses directed towards the post. The executing engine (514-6) executes one action. The executing engine (514-6) may execute several actions.

Figure 6:
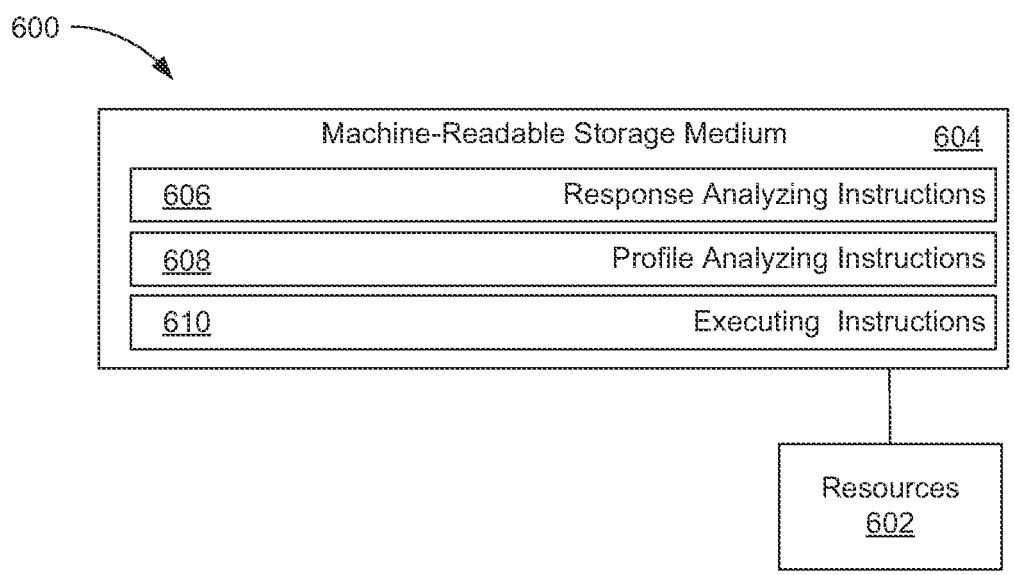
FIG. 6 is a diagram of an example of a reducing system, according to the principles described herein.

FIG. 6 is a diagram of a reducing system, according to one example of principles described herein. In this example, the reducing system (600) includes resource(s) (602) that are in communication with a machine-readable storage medium (604). Resource(s) (602) may include one processor. In another example, the resource(s) (602) may further include at least one processor and other resources used to process instructions. The machine-readable storage medium (604) represents generally any memory capable of storing data such as instructions or data structures used by the reducing system (600). The instructions shown stored in the machine-readable storage medium (604) include response analyzing instructions (606), profile analyzing instructions (608), and executing instructions (610).

The machine-readable storage medium (604) contains computer readable program code to cause tasks to be executed by the resource(s) (602). The machine-readable storage medium (604) may be tangible and/or physical storage medium. The machine-readable storage medium (604) may be any appropriate storage medium that is not a transmission storage medium. A non-exhaustive list of machine-readable storage medium types includes non-volatile memory, volatile memory, random access memory, write only memory, flash memory, electrically erasable program read only memory, or types of memory, or combinations thereof.

The response analyzing instructions (606) represents instructions that, when executed, cause the resource(s) (602) to analyze content of a response to determine a negative response risk to a post. The profile analyzing instructions (608) represents instructions that, when executed, cause the resource(s) (602) to analyze a profile of a user to determine a tendency of the user to respond negatively in responses. The executing instructions (610) represents instructions that, when executed, cause the resource(s) (602) to execute, based on the negative response risk and the tendency, an action for the response to reduce negative responses directed towards the post.

Further, the machine-readable storage medium (604) may be part of an installation package. In response to installing the installation package, the instructions of the machine-readable storage medium (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the resource(s) (602) and the machine-readable storage medium (604) are located within the same physical component, such as a server, or a network component. The machine-readable storage medium (604) may be part of the physical component's main memory, caches, registers, non-volatile memory, or elsewhere in the physical component's memory hierarchy. Alternatively, the machine-readable storage medium (604) may be in communication with the resource(s) (602) over a network. Further, the data structures, such as the libraries, may be accessed from a remote location over a network connection while the programmed instructions are located locally. Thus, the reducing system (600) may be implemented on a user device, on a server, on a collection of servers, or combinations thereof.

The reducing system (600) of FIG. 6 may be part of a general purpose computer. However, in alternative examples, the reducing system (600) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A method for analysis of social interaction sentiment, the method comprising:
    receiving, from a first user, user preferences for a post;
    inferring from the user preferences registered trusted entities associated with the first user, which registered trusted entities:
        are users likely to respond positively to the post; and view the post before other entities view the post;
determining from the user preferences, role-specific content management preferences;
receiving a response, from a second user, to the post, the response comprises content to be posted on an activity stream of a social network;
analyzing the content of the response to determine a probability that the response contains negative sentiments directed towards the post by:
analyzing the facts and sentiments of the response;
deriving from the facts and the sentiments, via natural language processing, a meaning of the content of the response;
determining from the meaning of the content of the response, a probability that the response contains negative sentiments directed to the post; and
classifying the probability;
analyzing a profile of the second user by:
analyzing historical responses by the second user; and
statistically determining, from the historical responses, a tendency of the second user to respond negatively in responses;
executing, based on the probability that the response contains negative sentiments directed towards the post and the tendency, an action for the response to reduce negative responses directed towards the post;
monitoring responses by the registered trusted entities;
determining from the responses by registered trusted entities, when a registered trusted entity does not respond positively to the post; and
notifying the first user when the registered trusted entity does not respond positively to the post.

2. The method of claim 1, in which the profile of the second user comprises credentials of the second user, registered trusted entities, a subject matter expertise, a social circle analysis, a relationship with an author of the post, or combinations thereof.

3. The method of claim 1, in which the action comprises approving the response, rejecting the response, or moderating the response.

4. The method of claim 1, further comprising presenting a user interface (UI) to an author of the post to determine author preferences for the post.

5. The method of claim 1, further comprising sending at least a portion of the content of the response to a subject matter expert.

6. A system for analysis of social interaction sentiment, the system comprising:
a processor coupled to memory;
a plurality of engines, wherein each engine comprises program instructions stored in memory and executed by the processor, the plurality of engines comprising:
a presenting engine to present a user interface (UI) to an author of a post to determine author preferences for the post, wherein:
registered trusted entities are inferred from the author preferences, which registered trusted entities:
are users likely to respond positively to a post; and
view the post before other entities view the post; and
role-specific content management preferences are determined from the author preferences;
a receiving engine to receive a response to the post from a user, the response comprises content to be posted on an activity stream of a social network;
a response analyzing engine to analyze the content of the response to determine a probability that the response contains negative sentiments directed towards the post by:
analyzing the facts and sentiments of the response;
deriving from the facts and the sentiment, via natural language processing, a meaning of the content of the response;
determining from the meaning of the content of the response, a probability that the response contains negative sentiments directed to the post; and
classifying the probability;
a profile analyzing engine to analyze a profile of the user by:
analyzing historical responses by the user; and
statistically determining, from the historical responses, a tendency of the user to respond negatively in responses;
a sending engine to send at least a portion of the content of the response to a subject matter expert;
an executing engine to execute, based on the probability that the response contains negative sentiments directed towards the post and the tendency, an action for the response to reduce negative responses directed towards the post; and
a monitoring engine to:
monitor responses by the registered trusted entities;
determine from the responses by registered trusted entities, when a registered trusted entity does not respond positively to the post; and
notify the user when the registered trusted entity does not respond positively to the post.

7. The system of claim 6, in which the profile of the user comprises credentials of the user, registered trusted entities, a subject matter expertise, a social circle analysis, a relationship with the author of the post, or combinations thereof.

8. The system of claim 6, in which the action comprises approving the response.

9. The system of claim 6, in which the action comprises rejecting the response.

10. The system of claim 6, in which action comprises moderating the response.

11. A machine-readable storage medium encoded with instructions for analysis of social interaction sentiment, the instructions executable by a processor of a system to cause the system to:
receive, from a first user, user preferences for a post;
infer from the user preferences registered trusted entities associated with the first user, which registered trusted entities:
are users likely to respond positively to a post; and
view the post before other entities view the post;
determine from the user preferences, role-specific content management preferences;
analyze content of a response to the post from a second user to determine a probability that the response contains negative sentiments directed towards the post by:
analyzing the facts and sentiments of the response;
deriving from the facts and the sentiments, via natural language processing, a meaning of the content of the response;
determining from the meaning of the content of the response, a probability that the response contains negative sentiments directed to the post; and
classifying the probability;
analyze a profile of a second user by:
analyzing historical responses by the second user; and statistically determining, from the historical responses, a tendency of the second user to respond negatively in responses;

execute, based on the probability that the response contains negative sentiments directed towards the post and the tendency, an action for the response to reduce negative responses directed towards the post;

monitor responses by registered trusted entities;

determine from those responses when a registered trusted entity does not respond positively to the post; and notify the first user when the registered trusted entity does not respond positively to the post.

12. The machine-readable storage medium of claim 11, further comprising instructions that, when executed, cause the processor to present a user interface (UI) to an author of the post to determine author preferences for the post.

13. The machine-readable storage medium of claim 11, further comprising instructions that, when executed, cause the processor to receive the response to the post from the second user, the response comprises the content to be posted on an activity stream of a social network.

14. The machine-readable storage medium of claim 11, further comprising instructions that, when executed, cause the processor to send at least a portion of the content of the response to a subject matter expert.

15. The machine-readable storage medium of claim 11, in which the profile of the second user comprises credentials of the second user, registered trusted entities, subject matter expertise, a social circle analysis, a relationship with an author of the post, or combinations thereof.

16. The machine-readable storage medium of claim 11, in which the action comprises approving the response, rejecting the response, or moderating the response.

\* \* \* \* \*